US009992490B2

(12) United States Patent
Haque et al.

(10) Patent No.: US 9,992,490 B2
(45) Date of Patent: Jun. 5, 2018

(54) VIDEO PARAMETER SET (VPS) SYNTAX RE-ORDERING FOR EASY ACCESS OF EXTENSION PARAMETERS

(71) Applicant: SONY CORPORATION, Tokyo (JP)

(72) Inventors: Munsi Haque, San Jose, CA (US); Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 381 days.

(21) Appl. No.: 14/035,680

(22) Filed: Sep. 24, 2013

(65) Prior Publication Data

US 2014/0086334 A1 Mar. 27, 2014

Related U.S. Application Data

(60) Provisional application No. 61/705,716, filed on Sep. 26, 2012, provisional application No. 61/708,381, filed on Oct. 1, 2012.

(51) Int. Cl.
*H04N 7/26* (2006.01)
*H04N 19/44* (2014.01)
*H04N 19/70* (2014.01)
*H04N 19/30* (2014.01)

(52) U.S. Cl.
CPC ....... *H04N 19/00533* (2013.01); *H04N 19/30* (2014.11); *H04N 19/70* (2014.11)

(58) Field of Classification Search
CPC ....... H04N 19/70; H04N 19/30; H04N 19/597
See application file for complete search history.

(56) References Cited

U.S. PATENT DOCUMENTS

| | | | |
|---|---|---|---|
| 5,956,026 A | 9/1999 | Ratakonda | |
| 8,938,004 B2 | 1/2015 | Boyce et al. | |
| 9,270,989 B2 * | 2/2016 | Hannuksela | ........... H04N 19/70 |
| 2008/0310500 A1 | 12/2008 | Winger | |
| 2010/0254458 A1 | 10/2010 | Amon | |
| 2011/0286530 A1 | 11/2011 | Tian et al. | |
| 2012/0075436 A1 | 3/2012 | Chen | |
| 2012/0163452 A1 | 6/2012 | Horowitz | |
| 2012/0207227 A1 | 8/2012 | Tsai | |
| 2012/0229602 A1 | 9/2012 | Chen | |
| 2012/0230431 A1 | 9/2012 | Boyce | |
| 2012/0275517 A1 | 11/2012 | Boyce et al. | |
| 2013/0089134 A1 | 4/2013 | Wang et al. | |
| 2013/0107942 A1 | 5/2013 | Chen et al. | |

(Continued)

OTHER PUBLICATIONS

Gary J. Sullivan, Overview of the High Efficiency Video Coding (HEVC) Standard, IEEE transactions on Circuits and System for Video Technology,Dec. 2012, pp. 1649-1668, Vo., 22, No. 12.

(Continued)

*Primary Examiner* — Neil Mikeska
(74) *Attorney, Agent, or Firm* — Chip Law Group

(57) ABSTRACT

The HEVC VPS Syntax Structure is modified by re-ordering of some syntax parameters for the future HEVC Extensions in scalable video coding, multi-view coding and 3D video coding areas. This re-ordering enables external network devices such as middle-boxes to easily access of some of the useful parameters in VPS and its extension data that are able to be used for session negotiation and/or capability exchanges for better communication and system integration purposes.

21 Claims, 5 Drawing Sheets

(56) References Cited

U.S. PATENT DOCUMENTS

| | | | |
|---|---|---|---|
| 2013/0182755 A1* | 7/2013 | Chen | H04N 19/70 375/240.01 |
| 2013/0266077 A1* | 10/2013 | Boyce | H04N 19/70 375/240.25 |
| 2013/0279564 A1* | 10/2013 | Wang | H04N 19/00139 375/240.02 |
| 2013/0287093 A1* | 10/2013 | Hannuksela | H04N 19/00769 375/240.02 |
| 2013/0287115 A1* | 10/2013 | Wang | H04N 19/70 375/240.18 |
| 2013/0294499 A1* | 11/2013 | Wang | H04N 19/70 375/240.02 |
| 2013/0294500 A1* | 11/2013 | Wang | H04N 19/70 375/240.02 |
| 2013/0343465 A1* | 12/2013 | Chen | H04N 19/597 375/240.24 |
| 2014/0003489 A1* | 1/2014 | Hannuksela | H04N 19/70 375/240.02 |
| 2014/0003491 A1* | 1/2014 | Chen | H04N 19/597 375/240.02 |
| 2014/0003492 A1 | 1/2014 | Chen | |
| 2014/0003493 A1* | 1/2014 | Chen | H04N 19/597 375/240.02 |
| 2014/0003504 A1* | 1/2014 | Ugur | H04N 19/00757 375/240.12 |
| 2014/0078249 A1 | 3/2014 | Wang | |
| 2014/0086303 A1 | 3/2014 | Wang | |
| 2014/0086333 A1 | 3/2014 | Wang | |
| 2014/0086334 A1* | 3/2014 | Haque | H04N 19/70 375/240.25 |
| 2014/0092996 A1 | 4/2014 | Wang | |
| 2014/0168362 A1* | 6/2014 | Hannuksela | H04N 13/0048 348/43 |
| 2014/0181885 A1 | 6/2014 | Rusert | |
| 2014/0192858 A1 | 7/2014 | Haque et al. | |
| 2014/0192859 A1 | 7/2014 | Haque et al. | |
| 2014/0294063 A1 | 10/2014 | Chen | |
| 2014/0301451 A1 | 10/2014 | Deshpande | |
| 2015/0245046 A1 | 8/2015 | Tsukuba | |

OTHER PUBLICATIONS

Miska M. Hannuksela, et al.,"VPS Extension Design", Joint Collaborative Team Video Coding (JCT-VC) of ITU-T, SF 16WP 3 and ISO/IEC JTC 1/SC 29/WG 11, 11th Meeting: Shanghai, CN, Oct. 10-19, 2012, pp. 1-8 Document JCTV-K0274.

Jill Boyce,"NAL Unit Header and Parameter Set Designs for HEVC Extensions", Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, pp. 1-8, Document JCTV-K1007.

Jill Boyce,"VPS Syntax for Scalable and 3D Extensions", VIDYO Person Telepresence, Document, JCTVC-K0204, pp. 1-14.

Munsi Haque,"On Support of Mixed Video Sequences in High Level Syntaxes", Joint Collaborative Team on Video Coding (JCT-VC) of ITU-T SG 16 WP 3 and ISO/IEC JTC 1/SC 29/WG 11, 11th Meeting: Shanghai, CN, Oct. 9-19, 2012, pp. 1-7, Document JCTV-K0232, WG11 Number: m26564.

Benjamin Bross,"High Efficiency Video Coding (HEVC) Test Specification Draft 9", Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, pp. 1-317, Document JCTV-K1003.

* cited by examiner

VIDEO PARAMETER SET (VPS) SYNTAX RE-ORDERING FOR EASY ACCESS OF EXTENSION PARAMETERS

CROSS-REFERENCE TO RELATED APPLICATION(S)

This application claims priority under 35 U.S.C. § 119(e) of the U.S. Provisional Patent Application Ser. No. 61/705,716, filed Sep. 26, 2012 and titled, "VIDEO PARAMETER SET (VPS) SYNTAX RE-ORDERING FOR EASY ACCESS OF EXTENSION PARAMETERS" and U.S. Provisional Patent Application Ser. No. 61/708,381, filed Oct. 1, 2012 and titled, "VIDEO PARAMETER SET (VPS) SYNTAX RE-ORDERING FOR EASY ACCESS OF EXTENSION PARAMETERS" which are hereby incorporated by reference in their entireties for all purposes.

FIELD OF THE INVENTION

The present invention relates to the field of video encoding. More specifically, the present invention relates to high efficiency video coding.

BACKGROUND OF THE INVENTION

The Video Parameter Set (VPS) has been added as metadata to describe the overall characteristics of coded video sequences, including the dependencies between temporal sublayers. The primary purpose of this is to enable the compatible extensibility of the standard in terms of signaling at the systems layer, e.g., when the base layer of a future extended scalable or multiview bitstream would need to be decodable by a legacy decoder, but for which additional information about the bitstream structure that is only relevant for the advanced decoder would be ignored.

SUMMARY OF THE INVENTION

The HEVC VPS Syntax Structure is modified by re-ordering of some syntax parameters for the future HEVC Extensions in scalable video coding, multi-view coding and 3D video coding areas. This re-ordering enables external network devices such as middle-boxes to easily access of some of the useful parameters in VPS and its extension data that are able to be used for session negotiation and/or capability exchanges for better communication and system integration purposes.

In one aspect, a method programmed in a non-transitory memory of a device comprises decoding content and accessing information related to the content without performing entropy decoding. The information comprises video parameter set extension information. The information is located near a video parameter set network abstract layer unit payload. The information is fixed-length. The information is for negotiation and/capability exchange. The information defines a parameter which specifies a total number of bytes present in a profile level and video parameter set extension data. The content comprises video content. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.

In another aspect, a method programmed in a non-transitory memory of a device comprises providing content and enabling access of information related to the content, wherein the information is accessible without performing entropy decoding. The information comprises video parameter set extension information. The information is located near a video parameter set network abstract layer unit payload. The information is fixed-length. The information is for negotiation and/capability exchange. The information defines a parameter which specifies a total number of bytes present in a profile level and video parameter set extension data. The content comprises video content. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.

In another aspect, an apparatus comprises a non-transitory memory for storing an application, the application for decoding content and accessing information related to the content without performing entropy decoding and a processing component coupled to the memory, the processing component configured for processing the application. The information comprises video parameter set extension information. The information is located near a video parameter set network abstract layer unit payload. The information is fixed-length. The information is for negotiation and/capability exchange. The information defines a parameter which specifies a total number of bytes present in a profile level and video parameter set extension data. The content comprises video content.

DETAILED DESCRIPTION OF THE PREFERRED EMBODIMENT

Figure 1:
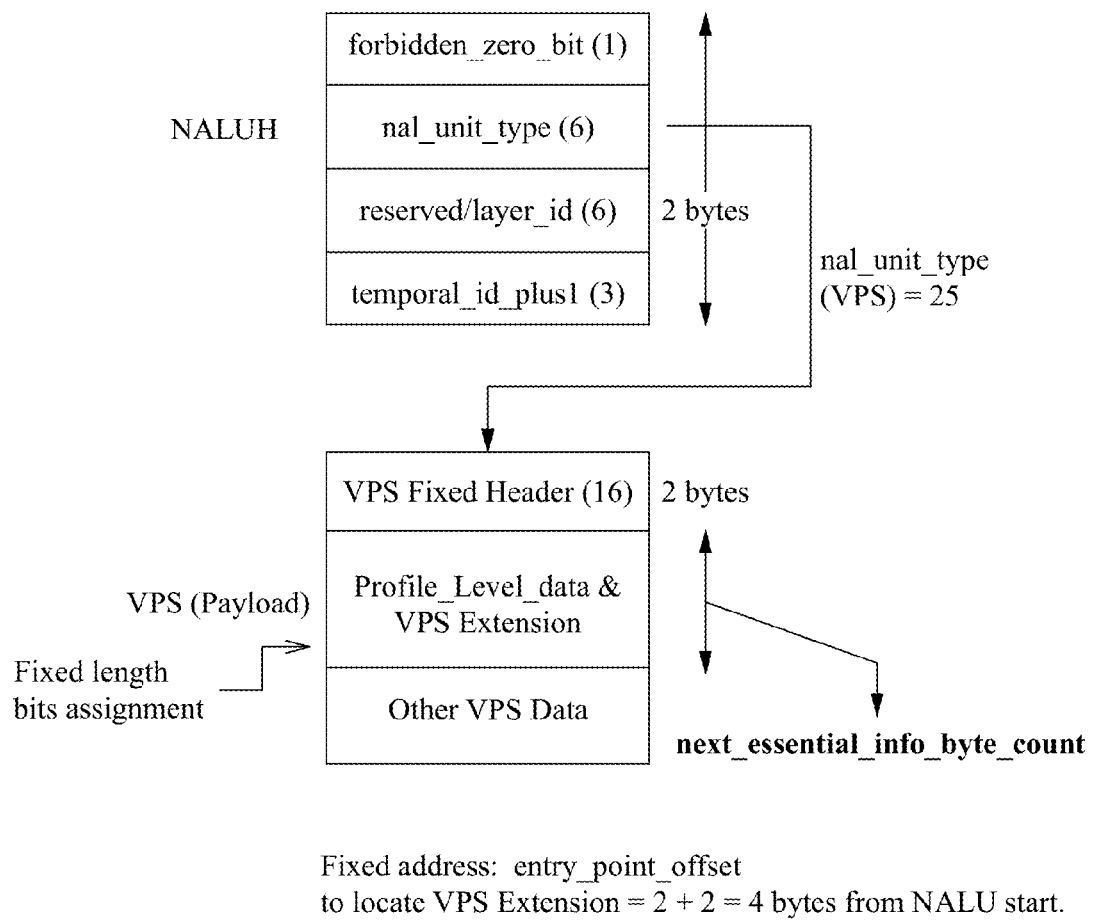
FIG. 1 illustrates a diagram of VPS Extension information near the beginning of the VPS NALU payload according to some embodiments.

Video Parameter Set (VPS) syntax re-ordering for easy access of extension parameters is described herein. Specifically, the syntax parameters for the VPS and VPS Extension Syntax structures available in the "straw man" designs for High Efficiency Video Coding (HEVC) extensions are re-ordered. The re-ordering allows easy access of some of the syntax parameters with fixed lengths by external network devices for better communication purposes.

On HEVC VPS Syntax Structure

The VPS syntax structure in the current Draft International Standard (DIS) specification contains three undefined syntaxes: reserved_zero bits–vps_reserved_zero_2bits, vps_reserved_zero_6bits and vps_reserved_zero_12bits.

In the previous "straw man" designs of VPS and its extensions, the last two undefined syntaxes above are utilized as max_num_layers_minus1 and next_essential_info_byte_offset. Also, in the previous designs, two design approaches are considered for the VPU Extension syntax structures, out of which either one or both may be considered for HEVC extensions.

On VPS Syntax Structure Changes

The following VPS syntax structure is available in the previous design, where the vps_reserved_zero_12bits in DIS is replaced by the syntax parameter: next_essential_info_byte_offset.

| video_parameter_set_rbsp( ) { | Descriptor |
|---|---|
| video_parameter_set_id | u(4) |
| vps_temporal_id_nesting_flag | u(1) |
| reserved_zero_2bits | u(2) |
| max_num_layers_minus1 //reserved_zero6bits in DIS | u(6) |
| vps_max_sub_layers_minus1 | u(3) |
| profile_level(1, vps_max_sub_layers_minus1) | |
| //should be profile_tier_level | |
| next_essential_info_byte_offset //reserved_zero_12bits in DIS | u(12) |
| for (i=0; i<=vps_max_sub_layers_minus1; i++) { | |
| vps_max_dec_pic_buffering[i] | ue(v) |
| vps_max_num_reorder_pics[i] | ue(v) |
| vps_max_latency_increase[i] | ue(v) |
| } | |
| num_hrd_parameters | ue(v) |
| for(i=0;i<num_hrd_parameters;i++) { | |
| if(i>0) | |
| op_point(i) | |
| hrd_parameters(i==0, vps_max_sub_layers_minus1) | |
| } | |
| bit_equal_to_one | u(1) |
| vps_extension( ) | |
| vps_extension_flag | u(1) |
| if(vps_extension_flag) | |
| while(more_rbsp_data( )) | |
| vps_extension_data_flag | u(1) |
| rbsp_trailing_bits( ) | |
| } | |

The syntax parameter next_essential_info_byte_offset has been previously defined as follows: "specifies the byte offset of the next set of fixed-length coded information in the video parameter set NAL unit, starting from its beginning of the NAL unit."

However, the "next set of" syntax parameters of "pics" information (buffering, reorder, latency) present after this next_essential_info_byte_offset are not of fixed-length sizes in the above syntax structure, but of unsigned integer 0-th order Exp-Golomb-codes, ue(v).

Also, such fixed coded length information is important "for session negotiation and/or capability exchange," especially in network-related middle-box (e.g., a firewall) or other simpler devices. Modifying the syntax will enable easy access of the information that VPS and VPS extension provide in their respective syntax parameters without the need of any entropy decoding function. The above VPS syntax structure also contains a new syntax structure extension of vps_extension( ).

In previous designs, the VPS Extension syntax structure had two "strawman" design approaches listed, and both of them contain syntax parameters with fixed-length information. Also, for a new VPS Extension structure all such syntax parameters contain fixed-length information. Many of these VPS Extension syntax parameters will also be valuable for external network devices to browse and extract useful information for better communication purposes. The "profile_tier_level(1, vps_max_sub_layers_minus1)" syntax structure contains fixed-length syntax parameters.

However, the positioning of such VPS extension information in the VPS syntax structure as shown above, is changed as follows to enable easy access of these extension parameters:

| video_parameter_set_rbsp( ) { | Descriptor |
|---|---|
| video_parameter_set_id | u(4) |
| vps_temporal_id_nesting_flag | u(1) |
| reserved_zero_2bits | u(2) |
| max_num_layers_minus1 //reserved_zero6bits in DIS | u(6) |
| vps_max_sub_layers_minus1 | u(3) |
| next_essential_info_byte_count //reserved_zero_12bits in the base spec | u(12) |
| profile_tier_level(1, vps_max_sub_layers_minus1) | |
| //change in the name | |
| bit_equal_to_one | u(1) |
| vps_extension( ) | |
| while(!byte_aligned( )) | |
| vps_extension_byte_alignment_reserved_one_bit | u(1) |
| for (i=0; i<=vps_max_sub_layers_minus1; i++) { | |
| vps_max_dec_pic_buffering[i] | ue(v) |
| vps_max_num_reorder_pics[i] | ue(v) |
| vps_max_latency_increase[i] | ue(v) |
| } | |
| num_hrd_parameters | ue(v) |
| for(i=0;i<num_hrd_parameters;i++) { | |
| if(i>0) | |
| op_point(i) | |
| hrd_parameters(i==0, vps_max_sub_layers_minus1) | |
| } | |
| vps_extension_flag | u(1) |
| if(vps_extension_flag) | |
| while(more_rbsp_data( )) | |
| vps_extension_data_flag | u(1) |
| rbsp_trailing_bits( ) | |
| } | |

In this syntax parameter reordering, the VPS Extension information is placed near the beginning of the VPS Network Abstract Layer Unit (NALU) payload for easy access. This is because much VPS Extension information for HEVC extensions may be directly useable by middle-boxes and other network devices. In the above syntax structures, the previously defined next_essential_info_byte_offset is renamed as next_essential_info_byte_count.

Also the semantics description of the modified syntax is changed as follows: next_essential_info_byte_count specifies the total number of bytes occupied by the optional fields: profile_tier_level(.), vps_extension( ) and any stuffing bits including the bits of the syntax parameters bit_equal_to_one and vps_extension_byte_alignment_reserved_one_bit. The next_essential_info_byte_count is the byte count independent from statistical codes bits-allocation[ue(v)]. The byte_offset from the start of the VPS NAL Unit packet to next_essential_info_byte_count is already known as 4.

FIG. 1 illustrates a diagram of VPS Extension information near the beginning of the VPS NALU payload according to some embodiments. The VPS Extension information is placed near the beginning of the VPS NALU payload for easy access. The next_essential_info_byte_count helps to locate and access information (in some embodiments, essential information) in VPS NAL unit without the need of entropy decoding. The next_essential_info_byte_count is a re-defined syntax element, which shows the byte-count in Profile_level and VPS Extension data. VPS information for non-base layer or view starts from a byte-aligned position of VPS NAL unit, with fixed-length coded information.

Fixed addressing is able to be used. A fixed offset length in bytes for fixed addressing as shown in FIG. 1.

Explicit addressing is only used if VPS Extension block is pushed down into the VPS data area after profile_and_level( . . . ) loop. Two possible syntaxes (entry_point_offset, offset_len_minus1) are able to be used for explicit addressing to locate VPS Extension in the NALU.

The syntax element reserved_zero_12bits in VPS is replaced by a syntax element next_essential_info_byte_offset. The syntax is located after the VPS fixed header or before the profile_and_level( . . . ) loop.

The syntax element vps_reserved_zero_2bits is 0 in bitstreams conforming to version-1 HEVC standard. Other values are reserved for future use. Decoders ignore the value of vps_reserved_zero_2bits.

The syntax element max_num_layers_minus1 plus 1 specifies the maximum number of layers in the coded video sequences referring to the VPS.

The syntax element next_essential_info_byte_offset specifies the byte offset of the next set of fixed-length coded information in the VPS NAL unit, starting from the beginning of the NAL unit. VPS information for the non-base layer or view starts from a byte-aligned position of VPS NAL unit, with fixed-length coded information that is used for session negotiation and/or capability exchange. The byte offset helps to locate and access information in VPS NAL unit without the need of entropy decoding, where some network entities may desire to access only the information in VPS for session negotiation and/or capability exchange.

Only the first syntax of vps_reserved_zero_2bits may be available to support mixed mode sequences such as 2D/3D views or Frame/Field sequences.

Width/height syntaxes in SPS may be sufficient perhaps to differentiate Frame/Field.

| vps_reserved_zero_2bits | Sequence type |
|---|---|
| 00 | HEVC version-1, Frame only |
| 01 | HEVC version-1, Frame/Field |
| 10 . . . 11 | reserved |

In the syntax below, vps_reserved_zero_2bits is changed to vps_sequence_type:

| video_parameter_set_rbsp( ) { | Descriptor |
|---|---|
| video_parameter_set_id | u(4) |
| vps_temporal_id_nesting_flag | u(1) |
| vps_sequence_type //reserved_zero_2bits | u(2) |
| max_num_layers_minus1 //reserved_zero6bits | u(6) |
| vps_max_sub_layers_minus1 | u(3) |
| next_essential_info_byte_offset //reserved_zero_12bits in the base spec | u(12) |
| profile_level(1, vps_max_sub_layers_minus1) | |
| bit_equal_to_one | u(1) |
| vps_extension( ) | |
| for (i=0; i<=vps_max_sub_layers_minus1; i++) { | |
| vps_max_dec_pic_buffering[i] | ue(v) |
| vps_max_num_reorder_pics[i] | ue(v) |
| vps_max_latency_increase[i] | ue(v) |
| } | |
| num_hrd_parameters | ue(v) |
| for(i=0;i<num_hrd_parameters;i++) { | |
| if(i>0) | |
| op_point(i) | |
| hrd_parameters(i==0, vps_max_sub_layers_minus1) | |

| video_parameter_set_rbsp( ) { | Descriptor |
|---|---|
| } | |
| vps_extension_flag | u(1) |
| if(vps_extension_flag) | |
| while(more_rbsp_data( )) | |
| vps_extension_data_flag | u(1) |
| rbsp_trailing_bits( ) | |
| } | | vps_sequence_type:

| vps_sequence_type | Sequence type in VPS |
|---|---|
| 00 | Frame only |
| 01 | Frame/Field |
| 10 | 2-d/3-d Frames |
| 11 | reserved |

In the syntax below, vps_extension( ) is included:

| video_parameter_set_rbsp( ) { | Descriptor |
|---|---|
| video_parameter_set_id | u(4) |
| vps_temporal_id_nesting_flag | u(1) |
| reserved_zero_2bits | u(2) |
| max_num_layers_minus1 //reserved_zero6bits in DIS | u(6) |
| vps_max_sub_layers_minus1 | u(3) |
| next_essential_info_byte_count //reserved_zero_12bits in the base spec | u(12) |
| profile_tier_level(1, vps_max_sub_layers_minus1) //change in the name | |
| bit_equal_to_one | u(1) |
| vps_extension( ) | |
| while(!byte_aligned( )) | u(1) |
| vps_extension_byte_alignment_reserved_one_bit | |
| for (i=0; i<=vps_max_sub_layers_minus1; i++) { | |
| vps_max_dec_pic_buffering[i] | ue(v) |
| vps_max_num_reorder_pics[i] | ue(v) |
| vps_max_latency_increase[i] | ue(v) |
| } | |
| num_hrd_parameters | ue(v) |
| for(i=0;i<num_hrd_parameters;i++) { | |
| if(i>0) | |
| op_point(i) | |
| hrd_parameters(i==0, vps_max_sub_layers_minus1) | |
| } | |
| vps_extension_flag | u(1) |
| if(vps_extension_flag) | |
| while(more_rbsp_data( )) | |
| vps_extension_data_flag | u(1) |
| rbsp_trailing_bits( ) | |
| } | |

Figure 2:
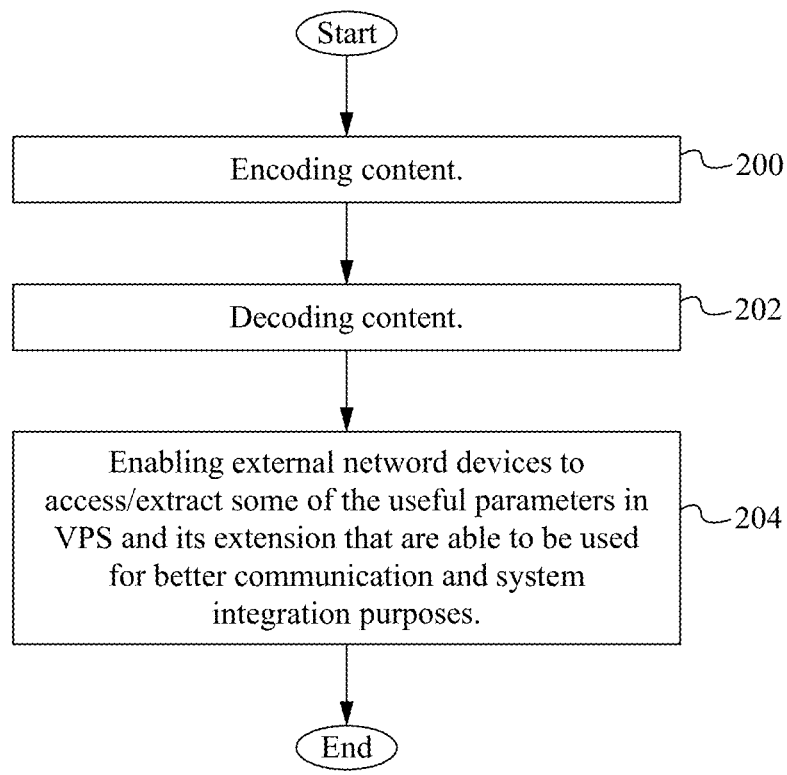
FIG. 2 illustrates a flowchart of a method of utilizing a modified VPS syntax according to some embodiments.

FIG. 2 illustrates a flowchart of a method of utilizing a modified VPS syntax according to some embodiments. In the step 200, content (e.g., a video) is encoded. In some embodiments, the content is encoded using the modified VPS syntax. In the step 202, decoding is implemented. For example, a video is decoded using any decoder. In the step 204, external network devices are enabled to access/extract some of the useful parameters in VPS and its extension that are able to be used for better communication and system integration purposes. In some embodiments, the step 204 is the external network devices accessing/extracting some of the useful parameters in VPS and its extension that are able to be used for better communication and system integration purposes. The data contains various HEVC Extension information in scalable video coding, multi-view coding and 3D video coding areas. The data is used for session negotiation and/or capability exchanges for better communication and system integration purposes. In the re-ordered VPS syntax the VPS extension information is near to VPS NALU payload. Additionally, a new parameter in the VPS syntax specifies the total number of bytes present in profile level and VPS extension data. In some embodiments, additional or fewer steps are implemented. For example, only the encoding side or only the decoding side is implemented. In some embodiments, the order of the steps is modified.

Figure 3:
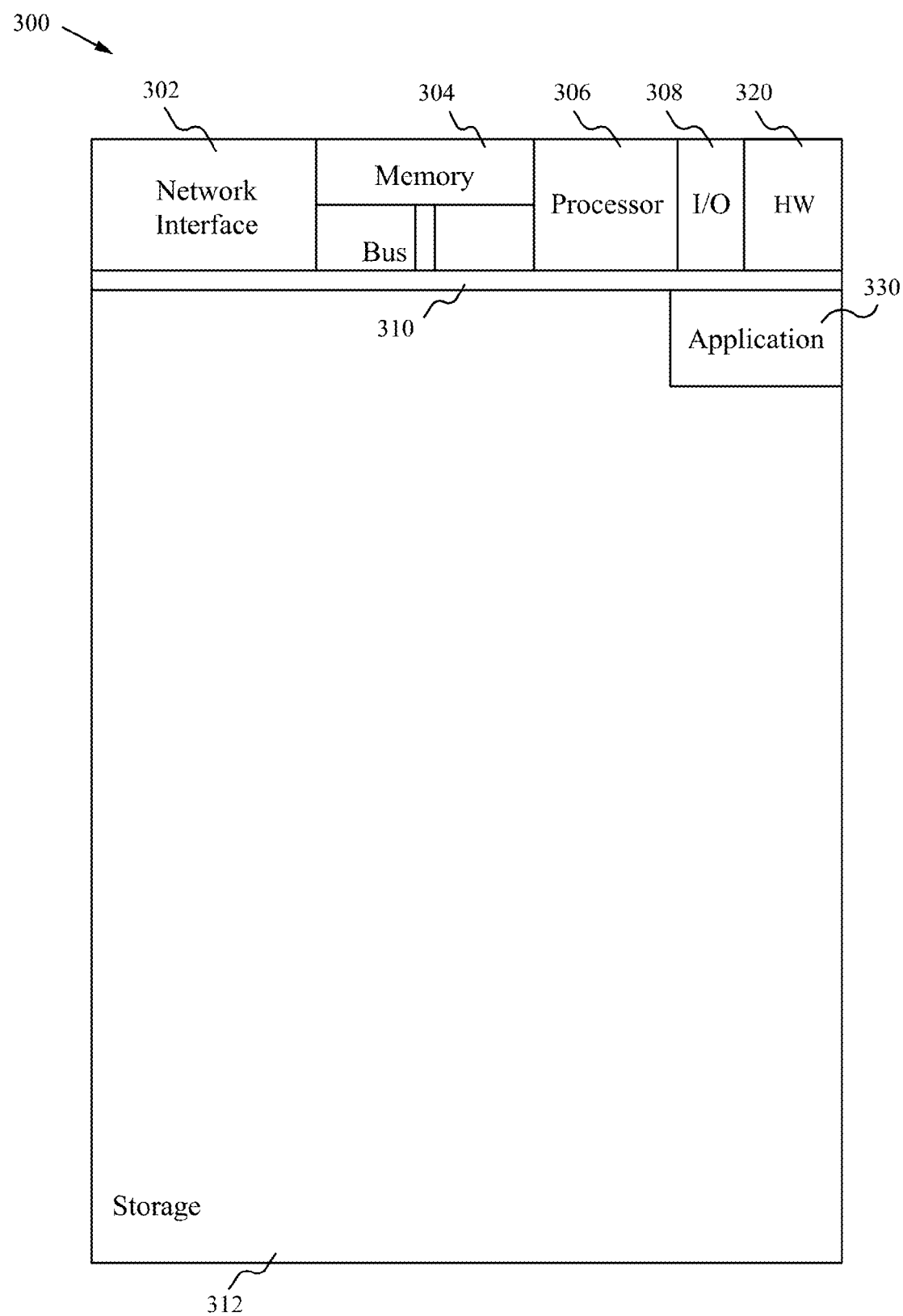
FIG. 3 illustrates a block diagram of an exemplary computing device configured to implement the re-ordered VPS method according to some embodiments.

FIG. 3 illustrates a block diagram of an exemplary computing device configured to implement the re-ordered VPS method according to some embodiments. The computing device 300 is able to be used to acquire, store, compute, process, communicate and/or display information such as images and videos. In general, a hardware structure suitable for implementing the computing device 300 includes a network interface 302, a memory 304, a processor 306, I/O device(s) 308, a bus 310 and a storage device 312. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, Blu-ray®, flash memory card or any other storage device. The computing device 300 is able to include one or more network interfaces 302. An example of a network interface includes a network card connected to an Ethernet or other type of LAN. The I/O device(s) 308 are able to include one or more of the following: keyboard, mouse, monitor, screen, printer, modem, touchscreen, button interface and other devices. Re-ordered VPS application(s) 330 used to perform the re-ordered VPS method are likely to be stored in the storage device 312 and memory 304 and processed as applications are typically processed. More or fewer components shown in FIG. 3 are able to be included in the computing device 300. In some embodiments, re-ordered VPS hardware 320 is included. Although the computing device 300 in FIG. 3 includes applications 330 and hardware 320 for the re-ordered VPS method, the re-ordered VPS method is able to be implemented on a computing device in hardware, firmware, software or any combination thereof. For example, in some embodiments, the re-ordered VPS applications 330 are programmed in a memory and executed using a processor. In another example, in some embodiments, the re-ordered VPS hardware 320 is programmed hardware logic including gates specifically designed to implement the re-ordered VPS method.

In some embodiments, the re-ordered VPS application(s) 330 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

Figure 4:
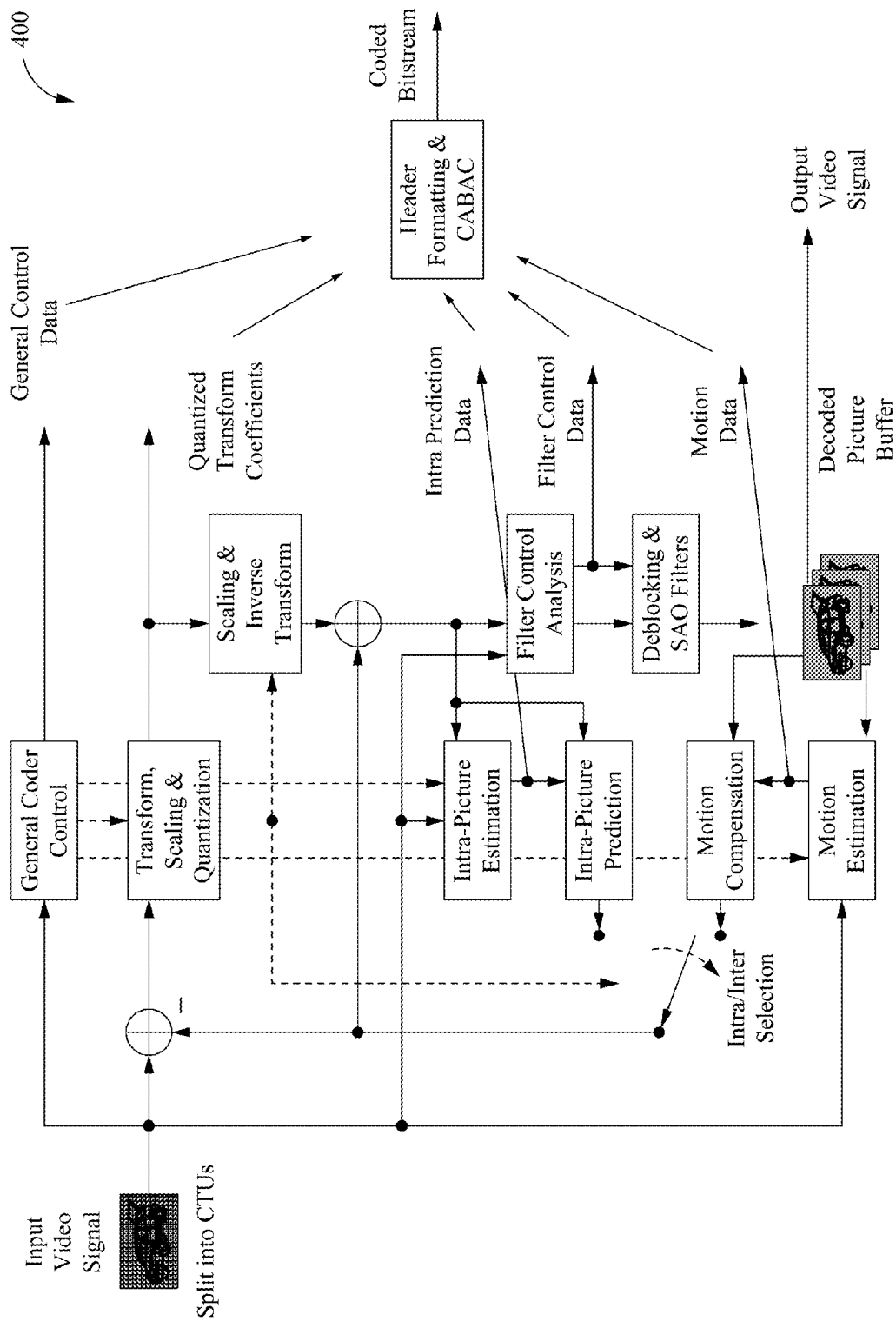
FIG. 4 illustrates a general diagram of an HEVC encoder according to some embodiments.

FIG. 4 illustrates a general diagram of an HEVC encoder according to some embodiments. The encoder 400 includes a general coder control component, a transform scaling and quantization component, a scaling and inverse transform component, an intra-picture estimation component, a filter control analysis component, an intra-picture prediction component, a deblocking and SAO filters component, a motion compensation component, a motion estimation component, and a header formatting and CABAC component. An input video signal is received by the encoder 400 and is split into Coding Tree Units (CTUs). The HEVC encoder components process the video data using the re-ordered VPS and generate a coded bitstream.

Figure 5:
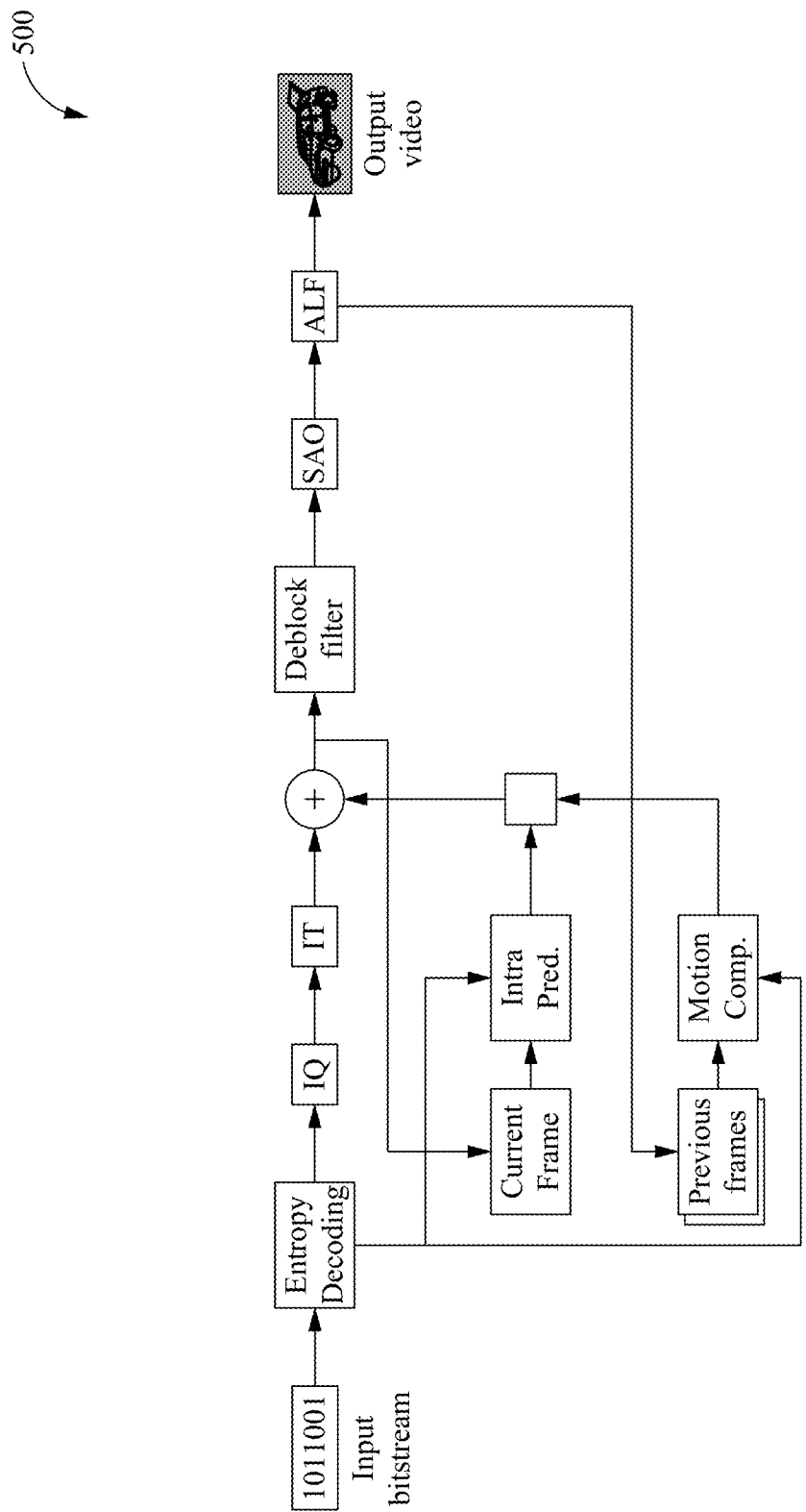
FIG. 5 illustrates a general diagram of an HEVC decoder according to some embodiments.

FIG. 5 illustrates a general diagram of an HEVC decoder according to some embodiments. The decoder 500 includes an entropy decoding component, an inverse quantization component, an inverse transform component, a current frame component, an intra prediction component, a previous frames component, a motion compensation component, a deblocking filter, an SAO component and an adaptive loop filter. An input bitstream (e.g., a coded video) is received by the decoder 500, and a decoded bitstream is generated for display. In some embodiments, the re-ordered VPS is utilized while decoding.

To utilize the re-ordered VPS method, external network devices are able to access parameters in VPS and its extension for better communication and system integration purposes. The re-ordered VPS method is automatically used when performing video processing or other times. The re-ordered VPS method is able to be implemented automatically without user involvement.

In operation, the HEVC VPS Syntax Structure is modified by re-ordering of some syntax parameters for the future HEVC Extensions in scalable video coding, multi-view coding and 3D video coding areas. This re-ordering will enable the external network devices for easy access of some of the useful parameters in VPS and its extension that are able to be used for better communication and system integration purposes. The VPS is generated using the re-ordered syntax structure.

Middle-boxes (network entities) extract some of the VPS syntax parameters and VPS extension data. The data contains various HEVC Extension information in scalable video coding, multi-view coding and 3D video coding areas. The data is used for session negotiation and/or capability exchanges for better communication and system integration purposes. Some syntax parameters are re-ordered inside the VPS which enables the external network devices easy access of some of the useful parameters in VPS and its extension.

U.S. patent application Ser. No. 14/035,711, titled "JCTVC-L0226: VPS AND VPS_EXTENSION UPDATES" and U.S. patent application Ser. No. 14/035,740, titled "JCTVC-L0227: VPS_EXTENSION WITH UPDATES OF PROFILE-TIER-LEVEL SYNTAX STRUCTURE" are hereby incorporated by reference in their entireties for all purposes.

Some Embodiments of Video Parameter Set (VPS) Syntax Re-Ordering for Easy Access of Extension Parameters 1. A method programmed in a non-transitory memory of a device comprising:
   a. decoding content; and
   b. accessing information related to the content without performing entropy decoding.
2. The method of clause 1 wherein the information comprises video parameter set extension information.
3. The method of clause 1 wherein the information is located near a video parameter set network abstract layer unit payload.
4. The method of clause 1 wherein the information is fixed-length.

5. The method of clause 1 wherein the information is for negotiation and/capability exchange.
6. The method of clause 1 wherein the information defines a parameter which specifies a total number of bytes present in a profile level and video parameter set extension data.
7. The method of clause 1 wherein the content comprises video content.
8. The method of clause 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.
9. A method programmed in a non-transitory memory of a device comprising:
   a. providing content; and
   b. enabling access of information related to the content, wherein the information is accessible without performing entropy decoding.
10. The method of clause 9 wherein the information comprises video parameter set extension information.
11. The method of clause 9 wherein the information is located near a video parameter set network abstract layer unit payload.
12. The method of clause 9 wherein the information is fixed-length.
13. The method of clause 9 wherein the information is for negotiation and/capability exchange.
14. The method of clause 9 wherein the information defines a parameter which specifies a total number of bytes present in a profile level and video parameter set extension data.
15. The method of clause 9 wherein the content comprises video content.
16. The method of clause 9 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.
17. An apparatus comprising:
   a. a non-transitory memory for storing an application, the application for:
      i. decoding content; and
      ii. accessing information related to the content without performing entropy decoding; and
   b. a processing component coupled to the memory, the processing component configured for processing the application.
18. The apparatus of clause 17 wherein the information comprises video parameter set extension information.
19. The apparatus of clause 17 wherein the information is located near a video parameter set network abstract layer unit payload.
20. The apparatus of clause 17 wherein the information is fixed-length.
21. The apparatus of clause 17 wherein the information is for negotiation and/capability exchange.
22. The apparatus of clause 17 wherein the information defines a parameter which specifies a total number of bytes present in a profile level and video parameter set extension data.
23. The apparatus of clause 17 wherein the content comprises video content.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method, comprising:
   decoding content, wherein the content is encoded based on a modified video parameter set syntax,
      wherein the modified video parameter set syntax includes:
         placing, video parameter set extension information related to the content, adjacent to a beginning of a video parameter set network abstract layer unit; and
         placing an offset syntax parameter after a video parameter set fixed header; and
      accessing the video parameter set extension information, wherein the video parameter set extension information defines a count syntax parameter that specifies a total number of bytes in a profile level and video parameter set extension data included in the modified video parameter set syntax.
2. The method of claim 1, wherein the video parameter set extension information adjacent to a video parameter set network abstract layer unit payload.
3. The method of claim 1, wherein the video parameter set extension information has a fixed-length.
4. The method of claim 1, wherein the video parameter set extension information is for at least one of session negotiation or capability exchange in at least one device.
5. The method of claim 1, wherein the video parameter set extension information defines the count syntax parameter that specifies the total number of bytes in the video parameter set extension data.
6. The method of claim 1, wherein the content comprises video content.
7. A method, comprising:
   providing content, wherein the content is encoded based on a modified video parameter set syntax,
      wherein the modified video parameter set syntax includes:
         placing video parameter set extension information related to the content, adjacent to a beginning of a video parameter set network abstract layer unit; and
         placing an offset syntax parameter after a video parameter set fixed header; and
      accessing the video parameter set extension information, wherein the video parameter set extension information defines a count syntax parameter that specifies a total number of bytes in a profile level and video parameter set extension data included in the modified video parameter set syntax.

8. The method of claim 7, wherein the video parameter set extension information is adjacent to a video parameter set network abstract layer unit payload.

9. The method of claim 7, wherein the video parameter set extension information has a fixed-length.

10. The method of claim 7, wherein the video parameter set extension information for at least one of session negotiation or capability exchange in at least one device.

11. The method of claim 7, wherein the video parameter set extension information defines the count syntax parameter that specifies the total number of bytes in the video parameter set extension data.

12. The method of claim 7, wherein the content comprises video content.

13. An apparatus, comprising:
a memory configured to store at least one instruction; and
at least one processor configured to execute the at least one instruction in the memory, the at least one processor further configured to:
decode content, wherein the content is encoded based on a modified video parameter set syntax,
wherein the modified video parameter set syntax includes:
video parameter set extension information related to the content, adjacent to a beginning of a video parameter set network abstract layer unit; and
an offset syntax parameter after a video parameter set fixed header, and
access the video parameter set extension information,
wherein the video parameter set extension information defines a count syntax parameter that specifies a total number of bytes in a profile level and video parameter set extension data included in the modified video parameter set syntax.

14. The apparatus of claim 13, wherein the video parameter set extension information is adjacent to a video parameter set network abstract layer unit payload.

15. The apparatus of claim 13, wherein the video parameter set extension information has a fixed-length.

16. The apparatus of claim 13, wherein the video parameter set extension information is for at least one of session negotiation or capability exchange in at least one device.

17. The apparatus of claim 13, wherein the video parameter set extension information defines the count syntax parameter that specifies the total number of bytes in the video parameter set extension data.

18. The apparatus of claim 13, wherein the content comprises video content.

19. The method of claim 1, wherein the total number of bytes in the profile level is 1.

20. The method of claim 1, wherein the modified video parameter set syntax is based on a byte-alignment position of the video parameter set network abstract layer unit.

21. The method of claim 20, wherein the byte-alignment position is included in 1-bit information.

* * * * *